US008032676B2

(12) United States Patent
Wingard et al.

(10) Patent No.: US 8,032,676 B2
(45) Date of Patent: Oct. 4, 2011

(54) METHODS AND APPARATUSES TO MANAGE BANDWIDTH MISMATCHES BETWEEN A SENDING DEVICE AND A RECEIVING DEVICE

(75) Inventors: Drew E. Wingard, Palo Alto, CA (US); Glenn S. Vinogradov, Philadelphia, PA (US)

(73) Assignee: Sonics, Inc., Milpitas, CA (US)

( * ) Notice: Subject to any disclaimer, the term of this patent is extended or adjusted under 35 U.S.C. 154(b) by 1978 days.

(21) Appl. No.: 10/980,505

(22) Filed: Nov. 2, 2004

(65) Prior Publication Data

US 2006/0092944 A1    May 4, 2006

(51) Int. Cl.
*G06F 3/00* (2006.01)
*G06F 13/00* (2006.01)
*G06F 13/40* (2006.01)
*G06F 11/00* (2006.01)

(52) U.S. Cl. ............ 710/107; 710/29; 710/33; 710/307; 370/229

(58) Field of Classification Search ............ 710/29, 710/107, 33, 307, 56; 370/229
See application file for complete search history.

(56) References Cited

U.S. PATENT DOCUMENTS

| | | | |
|---|---|---|---|
| 5,689,659 A | 11/1997 | Tietjen et al. | |
| 5,699,460 A | 12/1997 | Kopet et al. | |
| 5,734,833 A * | 3/1998 | Chiu et al. | 709/225 |
| 5,745,791 A | 4/1998 | Peek et al. | |
| 5,761,348 A | 6/1998 | Honma | |
| 5,799,203 A | 8/1998 | Lee et al. | |
| 5,802,399 A | 9/1998 | Yumoto et al. | |
| 5,948,089 A | 9/1999 | Wingard et al. | |
| 6,084,934 A * | 7/2000 | Garcia et al. | 375/370 |
| 6,122,690 A | 9/2000 | Nannetti et al. | |
| 6,182,183 B1 | 1/2001 | Wingard et al. | |
| 6,205,084 B1 * | 3/2001 | Akaogi | 365/233.1 |
| 6,233,226 B1 * | 5/2001 | Gringeri et al. | 370/252 |
| 6,330,283 B1 | 12/2001 | Lafe | |
| 6,393,500 B1 | 5/2002 | Thekkath | |
| 6,678,423 B1 | 1/2004 | Trenary et al. | |
| 6,725,313 B1 | 4/2004 | Wingard et al. | |
| 6,785,753 B2 | 8/2004 | Weber et al. | |
| 6,868,459 B1 | 3/2005 | Stuber | |
| 6,891,088 B1 | 5/2005 | Neuhaus et al. | |
| 6,970,013 B1 | 11/2005 | Cory | |
| 6,981,088 B2 | 12/2005 | Holm et al. | |

(Continued)

FOREIGN PATENT DOCUMENTS

EP    1179785 A    2/2002

(Continued)

OTHER PUBLICATIONS

Culler, David E.: "Split-Phase Busses," CS 258, Computer Science Division, U.C. Berkely, Spring 1999, pp. 1-23.

(Continued)

*Primary Examiner* — Mark Rinehart
*Assistant Examiner* — Jeremy S Cerullo
(74) *Attorney, Agent, or Firm* — Rutan & Tucker LLP (57) ABSTRACT

Embodiments of apparatuses, systems, and methods are described for communicating information between functional blocks of a system across a communication fabric. Rate logic may couple to the communication fabric. The rate logic is configured to determine a data bandwidth difference between a first data bandwidth capability of the sending device and the lower of 1) a second data bandwidth capability of the sending device or 2) a third data bandwidth capability of the communication fabric.

25 Claims, 4 Drawing Sheets

U.S. PATENT DOCUMENTS

| | | |
|---|---|---|
| 7,155,554 B2 | 12/2006 | Vinogradov et al. |
| 7,346,040 B2 * | 3/2008 | Weinstein ............... 370/339 |
| 2002/0038393 A1 | 3/2002 | Ganapathy et al. |
| 2002/0107903 A1 | 8/2002 | Richter et al. |
| 2002/0161848 A1 | 10/2002 | Willman et al. |
| 2003/0099254 A1 | 5/2003 | Richter |
| 2003/0191884 A1 | 10/2003 | Anjo et al. |
| 2003/0212743 A1 | 11/2003 | Masri et al. |
| 2004/0017820 A1 | 1/2004 | Garinger et al. |
| 2005/0210164 A1 | 9/2005 | Weber et al. |
| 2005/0216641 A1 | 9/2005 | Weber et al. |
| 2006/0092944 A1 | 5/2006 | Wingard et al. |
| 2006/0095635 A1 | 5/2006 | Vinogradov et al. |

FOREIGN PATENT DOCUMENTS

| | | |
|---|---|---|
| JP | 63296158 A | 12/1988 |
| WO | WO 2004008329 | 1/2004 |

OTHER PUBLICATIONS

International Search Report, PCT/US2005/008239, mailed Jun. 13, 2005, 3 pp.

International Search Report, PCT/US2005/008235, mailed Nov. 30, 2005, 6 pp.

AMBA 3.0 (AMABA AXI).

MIPS32 24 K Family of Synthesizable Processor Cores, Product Brief, MIPS Technologies.

Open Core Protocol Monitor, Data Sheet, Mentor Graphics.

IP Core-Centric Communications Protocol Introducing Open Core Protocol 2.0, www.design-reuse.com.

Enabling Reuse Via an IP Core-Centric Communications Protocol: Open Core Protocol, Wolf-Dietrich Weber, Sonics, Inc.

NECoBus: A High-End SOC Bus with a Portable & Low-Latency Wrapper-Based Interface Mechanism, Anjo et al., NEC Corporation, IEEE 2002.

Open Core Protocol Specification, Release 2.0, pp. 1-3, 31-57, copyright 2003.

Socket-Centric IP Core Interface Maximizes IP Applications, www.ocpip.org.

Definition of Burst Mode Access and Timing, www.pcguide.com.

Definition of Direct Memory Access (DMA) Modes and Bus Mastering DMA, www.pcguide.com.

Definition of PCI Bus Performance, www.pcguide.com.

Weiss, Ray, "PCI-X Exposed," TechOnLine, http://www.techonline.com/community/ed_resource/feature_article/7114, Jun. 28, 2005, 3 pages.

Wolf, Tilman et al., "Design Tradeoffs for Embedded Network Processors", Department of Computer Science Washington University, Jul. 10, 2000, 17 pages.

McGrath, Joel, "The Need for Package-Aware Methodology for IC Design", Chip Design Magazine, Mar. 20, 2006, 5 pages.

* cited by examiner

| Initiator | Fabric/Initiator Data Word Ratio | Fabric/Initiator Frequency Ratio |
|---|---|---|
| I1 | 1 | 4 |
| I2 | 2 | 4 |
| I3 | 4 | 8 |

Figure 2a

| Target | Fabric/Target Data Word Ratio | Fabric/Target Frequency Ratio |
|---|---|---|
| T1 | 1 | 2 |
| T2 | 2 | 2 |

Figure 2b

| Fabric/Initiator Data Word Ratio | Fabric/Initiator Frequency Ratio | Fabric/Target Data Word Ratio | Fabric/Target Frequency Ratio | Target/Initiator Bandwidth Ratio | Target Response Delay |
|---|---|---|---|---|---|
| 1 | 4 | 4 | 1 | 1 | 0 |
| 1 | 4 | 1 | 2 | 2 | 1 |
| 2 | 4 | 1 | 2 | 4 | 3 |
| 4 | 8 | 1 | 2 | 16 | 15 |
| 1 | 4 | 2 | 2 | 1 | 0 |
| 2 | 4 | 2 | 2 | 2 | 2 |
| 4 | 8 | 2 | 2 | 8 | 14 |
| 4 | 8 | 2 | 4 | 4 | 6 |

Figure 2c

| Target | Initiator | | |
|---|---|---|---|
| | I1 | I2 | I3 |
| T1 | 2 | 4 | 16 |
| T2 | 1 | 2 | 8 |

Figure 2d

| Target | Initiator | | |
|---|---|---|---|
| | I1 | I2 | I3 |
| T1 | 1 | 3 | 15 |
| T2 | 0 | 2 | 14 |

METHODS AND APPARATUSES TO MANAGE BANDWIDTH MISMATCHES BETWEEN A SENDING DEVICE AND A RECEIVING DEVICE

TECHNICAL FIELD

Embodiments of the present invention pertain to the field of communication fabrics, and, more particularly, to a shared interconnect in a System On a Chip.

BACKGROUND

In the past, some communication fabric designs were established such that no mismatch existed between the data bandwidth capability of a sender and a receiver. In such designs, flow control protocols are primarily needed to manage contention for shared resources.

Also in the past, some communication fabric designs had a mismatch between the data bandwidth capability of a sender and a receiver. A sending device may have a higher data bandwidth capability than the receiving device on the same communication fabric. The sending device typically transmitted data at the sender's full data bandwidth capability to the receiver. Since the receiver was unable to maintain such a high data bandwidth, the receiver would implement local buffering to capture some data at the sender's bandwidth. The communication fabric also typically implemented a flow control protocol that allowed the receiver to notify the sender when the local buffer was nearly full, so the receiver would stop transmitting in order to avoid data loss and/or loss of communication fabric efficiency. The size of the local buffer was typically based on several concerns, including the delay and precision of the flow control, the transaction sizes of the sender, and the required sustained bandwidth of the sender and receiver. The delay in transmitting the assertion of flow control from receiver to sender increases the required buffering due to the data that is transmitted by the sender during this delay, and can be measured as the flow control delay times the sender's data bandwidth. The precision in the flow control measures how much additional data might be sent by the sender after the sender receives the assertion of flow control; for example, a packetized communication fabric typically will not stop transmission once started until the end of a packet. The sender may have transaction sizes that are larger than this precision, and the protocol may require that entire sender transactions reach the receiver atomically. In such cases, the buffering must be large enough to hold the largest sender transaction. Finally, the required sustained bandwidth (also known as throughput) of the sender/fabric/receiver connection can also impact the required buffering. In particular, any requirement that the sustained bandwidth be close to the available receiver bandwidth increases local buffering requirements to cover flow control delays and communication fabric contention. In the same way that the delay in transmission of flow control assertion requires buffering to cover extra sender data, the delay in transmission of flow control negation requires buffering to provide data to the receiver while the flow control is being transmitted to the sender and the sender then begins transmitting data to the receiver. For a shared communication fabric, contention among senders can result in significant jitter (delay uncertainty) in guaranteeing when the sender will be able to transmit to the receiver. This jitter is based upon several factors, including the arbitration algorithm among the senders and the length of time the fabric can be blocked by unrelated transmissions. In fabrics where flow control assertion blocks all transmission, this jitter can get quite large. Even in non-blocking fabrics, the fabric may be effectively blocked for the duration of one full transaction from each of the assuming a fair arbitration policy. The local buffering may typically need to be large enough to cover the amount of Receiver bandwidth that would be consumed during the largest jitter period. For Communication fabrics with these characteristics, it is not unusual to find local buffering requirements that require storage of four or more sender transactions, which may equal as much as one kilobyte of storage and which can be quite costly in terms of die area for a SOC device with several senders and receivers. If the buffer is not large enough, the full capacity of the buffer could fill up with information transmitted by the sender before the receiver could empty the buffer by processing the information, and the receiver is forced to drop any new transmitted information.

SUMMARY

Embodiments of apparatuses, systems, and methods are described for communicating information between functional blocks of a system across a communication fabric. Rate logic may couple to the communication fabric. The rate logic may be configured to determine a data bandwidth difference between a first data bandwidth capability of the receiving device and the lower of 1) a second data bandwidth capability of the sending device or 2) a third data bandwidth capability of the communication fabric. A function of the rate logic may be to limit the data transmission rate of the sender to ensure that the receiver's local buffering may be minimized without loss of data and with a sustained bandwidth that matches the capabilities of the receiver.

Other features and advantages of the present invention will be apparent from the accompanying drawings and the detailed description that follows.

BRIEF DESCRIPTION OF THE DRAWINGS

Embodiments of the present invention are illustrated by way of example and are not intended to be limited by the figures of the accompanying drawings, in which.

DETAILED DESCRIPTION

In the following detailed description, numerous specific details are set forth in order to provide a thorough understanding of the invention. However, it will be understood by those skilled in the art that certain embodiments of the present invention may be practiced without these specific details. In other instances, well-known methods, procedures, components, and circuits have not been described in detail so as not to obscure the presented embodiments of the invention. The following detailed description includes several network adapters, which will be described below. These network adapters may be implemented by hardware components, such as logic, or by a combination of hardware and software. The terms data response and response packets should both be construed to be responses. The terms request and request packets should both be construed to be requests. A transaction may be a complete unit of data communication that is composed of one or more requests and one or more associated responses. In a write transaction, the direction of data transmission is the same as the associated requests. In a read transaction, the direction of data transmission is the same as the associated responses. Bandwidth may be the rate of information transfer, expressed as units of information transferred per unit time. Bandwidth capability may be the highest rate of information transfer that can be sustained by an element of the system. Sustained bandwidth and throughput may be the actual rate of information transfer achieved by an element of the system. An on-chip interconnect may be a collection of mechanisms that may be adapters and/or other logical modules along with interconnecting wires that facilitate address-mapped and arbitrated communication between multiple functional blocks on an SOC (System-on-Chip). A burst may be a set of transfers that are linked together into a transaction having a defined address sequence and number of transfers. A single (non-burst) request on an interface with burst support may be encoded as a request with any legal burst address sequence and a burst length of 1. A System on Chip shared interconnect system may be used as an example system to implement embodiments of the invention; however, the invention may be practiced on other networked systems equally as well.

Apparatuses, systems, and methods are described for communicating information between functional blocks across a communication fabric. Rate logic couples to the communication fabric. The rate logic may be configured to determine a data bandwidth difference between a first data bandwidth capability of the receiving device and the lower of 1) a second data bandwidth capability of the sending device or 2) a third data bandwidth capability of the communication fabric. The rate logic may be configured to implement a source limited transmission rate flow control. In some prior art in data networking, this may also be known as rate-based flow control. A benefit of such flow control schemes in communication systems is the reduction in buffering required to manage bandwidth differences between a sender, the communication fabric, and the receiver.

Figure 1A:
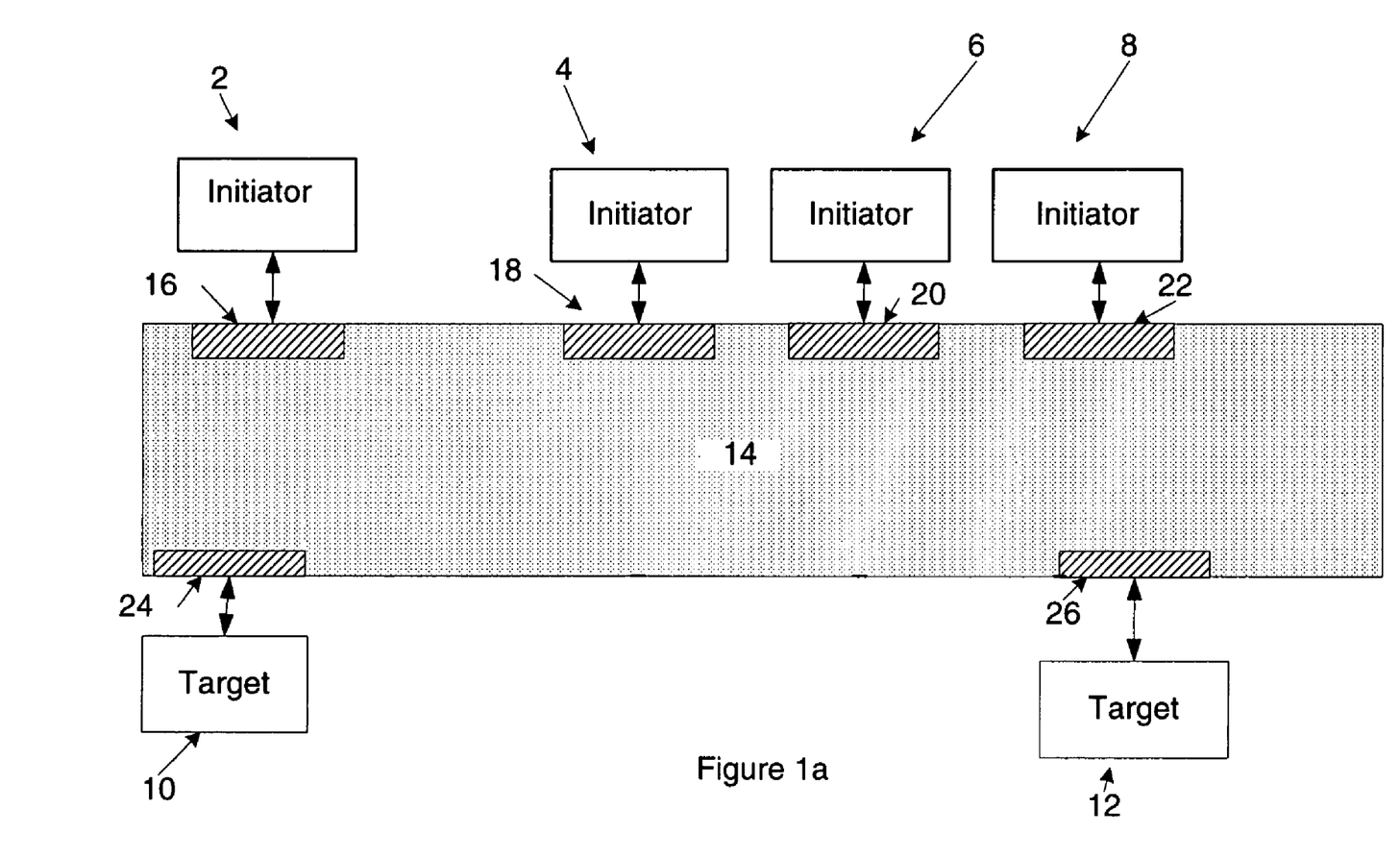
FIG. 1a illustrates a block diagram of an embodiment of a communication fabric with rate logic coupled to the communication fabric.

FIG. 1a illustrates a block diagram of an embodiment of a communication fabric with rate logic coupled to the communication fabric. The system may include a plurality of receiving devices, such as initiators 2-8, a plurality of sending devices such as targets 10-12, and a communication fabric 14. Information between the functional blocks 2-12 is communicated across the communication fabric 14, such as an interconnect, a bus, a cross-bar switch, a network on a chip, or similar communication mechanism in a system. Translation intelligence 16-26 connects to the communication fabric 14. One or more requests from an initiator, such as the first initiator 2, may be communicated to a target, such as the first target 12, over the communication fabric 14 to solicit one or more responses from the target. The one or more requests and the one or more responses may form a transaction. The purpose of a transaction may be to move data between functional blocks. The association between the one or more requests that form a transaction may be based on transferring one or more data words between the same initiator and target wherein the one or more data words have a defined address relationship. A single request may be associated with the transfer of one or more data words. Similarly, a single response may be associated with the transfer of one or more data words. A write transaction may move data from an initiator to a target, in the same direction as the request. A read transaction may move data from a target to an initiator, in the same direction as the response. The number of requests and the number of responses that form a transaction may be the same, or there may be more requests than responses, or there may be more responses than requests. The communication fabric 14 may use coupled resources for transmitting requests and responses. Alternately, the communication fabric 14 may use separate resources for transmitting requests and responses. The transaction of the one or more requests and the one or more responses may be split by communicating the one or more responses to the initiator when the one or more responses become available without the initiator having to poll for the communicated responses or block the communication fabric 14 waiting for a transmission of the one or more responses.

The initiator is decoupled from the waiting on the one or more responses to the one or more issued requests because the initiator may issue additional requests prior to receiving the one or more responses. The initiator is decoupled from the waiting on the one or more responses to the one or more issued requests because the initiator may relinquish control of the communication fabric 14 prior to receiving the response.

The first target 12 generates one or more responses to the one or more issued requests.

The translation intelligence 16-26 may include rate logic configured to determine a data bandwidth difference between a data bandwidth capability of a receiving device, such as the first initiator 2 and the lower of 1) the data bandwidth capability of the sending device, such as the first target 12 or 2) the data bandwidth capability of the communication fabric 14. Once the data bandwidth difference is determined, then the sending device limits its transmissions, such as responses, to the receiving device so that the sustained data bandwidth does not exceed the data bandwidth capability of the receiving device. This rate logic thus prevents overloading the data bandwidth capability of the receiving device based on the determined data bandwidth difference between the three devices. The sending device manages the transmission rate itself, without need for any form of start/stop nor credit-based flow control method. In one embodiment, the sending device accomplishes transmission rate control by inhibiting the sending device's arbitration attempts to arbitrate to send transmissions to the receiving device to be equal to or less than the determined data bandwidth capability of the receiver.

The data bandwidth capability of a particular device may be determined by multiplying the clock speed of the device times the number of signal wires connecting to that device for carrying data. The receiving device may have a first data bandwidth capability. For example, the first initiator 2 may operate at 4 million clock cycles per second (4 MHz) and have 32 signal wires connecting it to the translational intelligence, with each signal wire carrying one bit of data per clock cycle (e.g. a 4 byte data word), for a data bandwidth capability of 16 megabytes per second (16 MB/s). The sending device may have a second bandwidth N times greater than the first data bandwidth capability. For example, the first target 12 may operate at 16 MHz with an 8 byte data word for a data bandwidth capability of 128 megabytes per second. The communication fabric may operate at 64 MHz with an 8 byte data word for a data bandwidth capability of 512 megabytes per second. In this example, the sender's transmission rate should be limited by the difference between the data bandwidth capability of the sender and the receiver, which is the difference between 128 MB/s and 16 MB/s. The ratio between these values would be 128/16, which equals an 8 to 1 ratio.

Equivalently, the sending device must not transmit data to the receiver more than 12.5% of the time over a sustained period.

The sending device may send one or more data words in each transmission to the receiving device, depending on the capabilities of the sending device, the receiving device, and the communication fabric. In any case, the rate logic can control the sending device to limit the required data storage at the receiver to that required to hold one sender transmission. If the communication fabric implements a fair arbiter and the sending device transmits a constant number of data words on each arbitration grant, then the sending device may simply limit its attempts to arbitrate to send transmissions to the receiving device so that it never receives an arbitration grant more than once every N arbitration cycles (N=8 in the example above). As long as the receiving device has sufficient local buffering to capture the data from the sender transmitted after a single arbitration grant, the receiving device should be able to consume the data from its buffer before the next data transmission arrives from this sender. In an embodiment, an interleaver cooperating with the rate logic may generate a signal that instructs the sending device to transmit a single word to the receiving device in a time domain multiplexed manner, even though the sending device may group several data words together for transmission. The interleaver enables a time domain multiple access scheme where the communication fabric can support efficient transmission of single word data between pairs of senders and receivers. In the example above, the interleaver would instruct the sending device to transmit a data word every 8 clock cycles of the sending device. In an embodiment, the interleaver could operate in the communication fabric, at the same clock rate. In the above example, the transmissions going to the first initiator 2 occur in the transmission stream once every 32 clock cycles of the communication fabric.

The sustained transmission bandwidth from the sending device to the receiving device may be measured by dividing the quantity of data transmitted by the sender after a single arbitration grant by the elapsed time between arbitration grants. The sustained transmission bandwidth must not be greater than the data bandwidth capability of the receiving device in order to ensure efficient use of the communication fabric and avoid loss of data at the receiver. The sending device may attempt to send transmissions to the other receiving devices coupled to the communication fabric during the period between the first transmission to a first receiving device and the next transmission to that first receiving device. The rate logic would also prevent overloading the data bandwidth capabilities of those receiving devices as well.

The rate logic can generate the data bandwidth difference based on a predetermined basis in a static system or dynamically. If determined dynamically, then the data bandwidth difference may be based on 1) some data bandwidth capability information communicated in either an earlier transmission from the receiving device or a subsequent transmission from the receiving device and 2) the data bandwidth capability that the sending device knows about itself and the communication fabric.

In an embodiment, the translation intelligence 16-26 may include detection logic and conversion logic. The detection logic detects for a read request containing burst information that communicates one or more read requests in a transaction from an initiator, such as an Intellectual Property (IP) core, that are going to related addresses in the single target. Thus, the translation logic may detect for a transaction communicating either a non-incrementing address pattern transaction or an incrementing address transaction. The detection logic communicates to the conversion logic that the information is detected. The conversion logic converts the one or more read requests in the transaction to a single request with annotations in a field of the request to indicate how many read requests were combined and the addresses associated with each read request based upon the addresses in the target being related. The translation intelligence on the target side includes conversion logic to convert the single request with annotations into an original number of read requests, where each read request has its original target address.

In an embodiment, the translation intelligence 16-22 coupled to the initiators may convert the one or more requests associated with a first read transaction from an initiator to a single request packet write for transmission across the underlining communication fabric 14. The translation intelligence 24-26 coupled to the target may convert the single request packet write received from the communication fabric 14 back to one or more requests associated with a read transaction. The translation intelligence 24-26 coupled to the target may limit the rate at which the target sends responses to each initiator to prevent overloading the data bandwidth capability of that initiator based on determining a data bandwidth difference between the two devices. The translation intelligence 24-26 coupled to the target may convert the one or more responses associated with a read transaction to response packet writes for transmission across the underlining communication fabric 14. The translation intelligence 16-22 coupled to the initiator may also convert the response packet writes received from the communication fabric 14 back to one or more responses associated with the read transaction solicited by the one or more requests associated with the first read transaction.

In an embodiment, the translation intelligence 16-22 coupled to the initiators may convert the one or more requests associated with a first write transaction from an initiator to request packet writes for transmission across the underlining communication fabric 14. The translation intelligence 16-22 coupled to the initiator may limit the rate at which the initiator sends requests to each target to prevent overloading the data bandwidth capability of that target based on determining a data bandwidth difference between the two devices. The translation intelligence 24-26 coupled to the target may convert the request packet writes received from the communication fabric 14 back to one or more requests associated with a write transaction. The translation intelligence 24-26 coupled to the target may convert the one or more responses associated with a write transaction to a single response packet write for transmission across the underlining communication fabric 14. The translation intelligence 16-22 coupled to the initiator may also convert the single response packet write received from the communication fabric 14 back to one or more responses associated with the write transaction solicited by the one or more requests associated with the first write transaction.

Figure 1B:
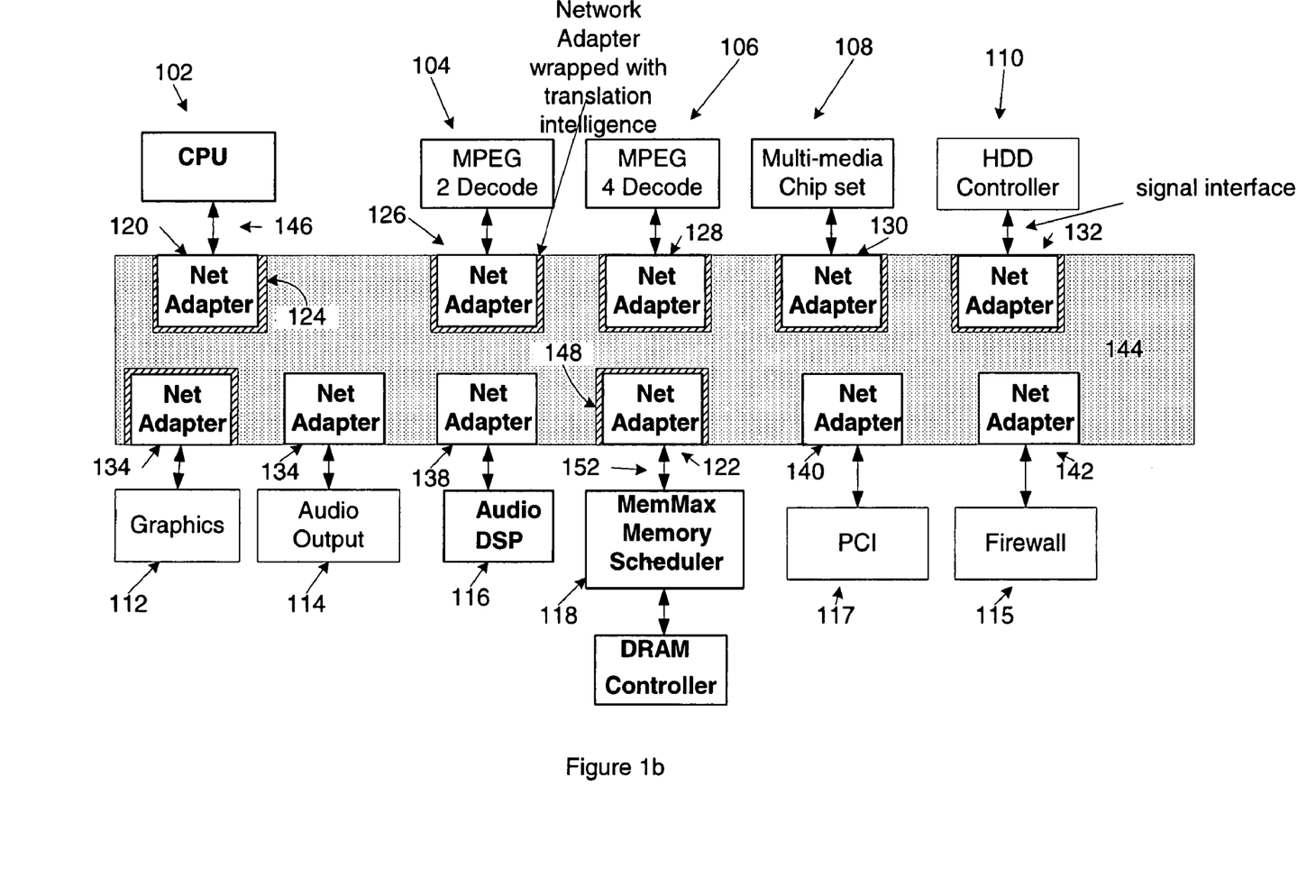
FIG. 1b illustrates a block diagram of an embodiment of a shared interconnect with rate logic coupled to the shared interconnect.

FIG. 1b illustrates a block diagram of an embodiment of a shared interconnect with rate logic coupled to the shared interconnect. A plurality of initiator Intellectual Property (IP) cores 102-118 may couple to a corresponding network adapter via a signal interface. An IP core may be a discrete wholly integrated functional block of logic that performs a particular function, such as a memory component, a wireless transmitter component, a Central Processing Unit (CPU) 102, Digital Signal Processors 116, hardware accelerators such as Moving Pictures Experts Group (MPEG) video compression components 104, 106, Graphics engine components 112, etc. for a System On a Chip (SOC). Initiator Intellectual Property (IP) cores on the SOC may be CPUs 102, multimedia chip sets 108, etc. Target IP cores may be Memory Schedulers 118, PCI bus controllers 117, etc. Some of the network adapters will be initiator network adapters, such as the first network adapter 120. Some of the network adapters will be target network adapters, such as the second network adapter 122. Translation intelligence may be wrapped around a typical distributed network adapter connected to the shared interconnect such as the first translation intelligence 124 wrapped around the first network adapter 120 or the second translation intelligence 148 wrapped around the second network adapter 122. The first translation intelligence 124 may be added as an initiator bridge module with translation intelligence. The second translation intelligence 148 may be added as a target bridge module with translation intelligence.

Note the described communication mechanism and network adapters may be used for any communication fabric but a shared interconnect 144 will be used as an example shared resource. The two or more network adapters 120, 122, and 126-142 connect to the communication fabric form a distributed arbitration mechanism for access to the shared resource.

In operation, a first initiator IP core 102 may generate a read request comprising information including a transaction length and an address sequence. A transaction length communicates that N number of data words will be read by this transaction from related addresses in a single target IP core. An address sequence communicates the address relationship among the data words to be read by the transaction. The address sequence may describe incrementing, wrapping, XOR, 2-dimensioinal block, or other burst sequences. The read request may comprise the length of the raster line occupied by a target data, the number of rows of raster lines occupied by the target data, and the length difference between the starting addresses of two consecutive raster lines occupied by the target data, thereby describing a two-dimensional region of data words in memory.

The first initiator IP core 102 communicates the N number of read requests across a first signal interface 146 to the first initiator network adapter 120 connected to the shared interconnect. The initiator IP cores communicate to the shared interconnect 144 with intelligent network adapters 120-142 through signal interfaces, such as the first signal interface 146. In an embodiment, the signal interface (also known as a "core socket") may be provided by the Open Core Protocol. Target IP cores also communicate to the shared interconnect 144 with intelligent network adapters 120-142 through these signal interfaces.

In an embodiment, the translation intelligence 124 in the initiator network adapter may merely have rate logic and communicate requests over the shared interconnect to the translation intelligence associated with a given target.

In an embodiment, the translation intelligence 124 in the initiator network adapter may have logic to detect for the presence of the transaction length and address sequence in the read request. If detected, the initiator network adapter and the target network adapter communicate requests and responses to each other through special write-type request packets and response packets with annotations added to these special request packets and response packets. If the transaction length and address sequence information is detected, the translation intelligence 124 in the initiator network adapter 120 converts the N number of read requests to a single write request with annotations in the data field of the write-type request packet to indicate how many read requests were combined, such as a transaction length annotation, and the addresses associated with each read request, such as a address sequence annotation.

In an embodiment, a direct transaction may occur over the communication fabric where the N number of requests are to be directly transmitted over the communication fabric to the target without conversion by any transaction logic.

The initiator network adapter 120 gains access to the shared interconnect 144 by winning a round of arbitration. The initiator network adapter 120 transmits the request(s) over the shared resource. The transmission logic in the initiator network adapter 120 transmits the request. After the request is transmitted, the initiator network adapter 120 relinquishes control of the interconnect 144 to allow other network adapters 122-142 to issue their requests. The initiator network adapter 120 may also issue additional requests associated with unrelated transactions prior to receiving the solicited responses.

In an embodiment, the second network adapter 122 contains conversion logic to convert the single request packet with annotations into the original number of read requests, where each read request has its original target address. The translation intelligence 148 in the target network adapter decodes annotations of the single write-type request packet, such as transaction length and address sequence, to perform the conversion. The translation intelligence 148 also stores the initiator's identification, such as an ID field encoded in the Connection ID field of the request received from the communication fabric.

The target network adapter 122 transmits the converted number of read requests across a second signal interface 152 to the target IP core. The target IP core, such as a Memory Scheduler 118, generates responses to the N number of read requests. Each response carries one word of data.

The initiator network adapter 120 does not need to use any resources of the communication fabric to check on the status of the target IP core's generation of responses to the N number of read requests. The initiator network adapter does not need to poll. The target IP core 118 will communicate the N number of responses to the read requests across the second signal interface 152 to the target network adapter connected to the shared interconnect 144 when the one or more responses become available without the initiator having to poll for the communicated responses.

The rate logic to limit the response bandwidth from target IP core 118 may be located in either in the target IP core 118 or the target network adapter 122. The rate logic may be configured to determine, dynamically or in a predetermined basis for a static system, a data bandwidth difference between a data bandwidth capability of each initiator and the lower of 1) a data bandwidth capability of the target IP core 118 or 2) a data bandwidth capability of the communication fabric. Once the data bandwidth difference is determined then the sending device limits its transmissions, such as responses, to the receiving device so that the sustained data bandwidth does not exceed the data bandwidth capability of the receiving device. Thus, the rate logic prevents overloading the data bandwidth capability of the receiving device based on the determined data bandwidth difference between the three devices. The sending device manages the transmission rate itself, without need for any form of start/stop nor credit-based flow control method. In one embodiment, the sending device accomplishes transmission rate control by inhibiting the sending device's arbitration attempts to arbitrate to send transmissions to the receiving device to be equal to or less than the determined data bandwidth capability of the receiver. For example, if the determined data bandwidth difference between the sending device and the receiving device is 8 to 1, then sending device attempts to arbitrate to send transmissions to the receiving device once every eight clock cycle or greater than that.

In an embodiment, the target network adapter 122 transmits the read data using a special write-type response packet across the communication fabric to the initiator network adapter 120. The target network adapter 122 may provide an address based on the stored initiator ID to cause the communication fabric to transmit the response packet to the initiator network adapter 120, as opposed to another initiator network adapter coupled to the communication fabric.

Thus, the sustained transmission rate of the sending device to the receiving device may be limited so that a sustained data bandwidth to the receiving device does not exceed the data bandwidth capability of the receiving device based on the determined data bandwidth difference.

The sustained transmission rate of the sending device to the receiving device may be also limited on an amount of local buffering at the receiving device. The rate logic at the sending device can control the size of each data transmission to be not greater than the actual amount of local buffering at the receiving device. If only 64 bytes of buffering exists at the receiving device then the sending device won't send transmissions with a size of 128 bytes. The rate logic at the sending device can also control the rate at which transmissions are being sent to the receiving device to avoid losing data. The data would be lost due to the data over filling the amount of local buffering either due to 1) the receiving device not consuming the data in the buffer rapidly enough 2) the amount of buffering at receiving device being insufficient to allow the communication fabric to keep up with the maximum transmission capability of the sender, or 3) something similar.

The amount of buffers at an initiator may be based on the pipelined depth of the communication fabric (N) divided by the data bandwidth ratio of the target to the initiator. The amount of buffers at an initiator may equal (N/R), where a length of each buffer is equal the length of a data word for the initiator. The transmission rate of the sending device may be optimized to ensure that local buffering of the receiving device may be minimized without loss of data and with a sustained bandwidth that matches the first data bandwidth capability of the receiving device based on the determined data bandwidth difference.

In an embodiment, the rate logic 148 can control the size of the transmission bandwidth, i.e. the instantaneous amount of information transmitted across communication fabric, to be equal to the size of the local buffering present at the receiving device. In an embodiment, the minimum amount of local buffering present at a receiving device is equal to the maximum transmission bandwidth for a single transmission from the sending device. In an embodiment, The number of buffers at initiator may be optimized so that the number of buffers is not greater than (N/R) which would result in excess buffering capability at the initiator and not less than (N/R) which may limit the rate at which the target can optimally transmit data to the initiator.

The target IP core generally has a data bandwidth capability N times greater than the data bandwidth capability of a given initiator IP core. The target IP core is limited in its transmission rate by the data bandwidth capability of the initiator IP core. The target IP core may simply limit its attempts to arbitrate to send transmissions to the initiator IP core so that it never receives an arbitration grant more than once every N arbitration cycles based on the data bandwidth difference. As long as the initiator IP core has sufficient local buffering to capture the data from the target IP core transmitted after a single arbitration grant, the initiator IP core should be able to consume the data from its buffer before the next data transmission arrives from this target IP core.

In an embodiment, an interleaver cooperating with the rate logic may generate a time domain multiplexed transmission signal from the target IP core. The interleaver cooperating with the rate logic may generate a signal that instructs the sending device to transmit a single word to the receiving device in a time domain multiplexed manner, even though the sending device may group several data words together for transmission. The interleaver enables the number of responses going to the first initiator IP core 102 to occur in the transmission stream at a rate to prevent overloading the first initiator IP core 102 based on the determined bandwidth difference.

In an embodiment, the rate Logic may inhibit arbitration to communicate a next response to the same initiator IP core to be equal to or greater than the inverse of the data bandwidth ratio rounded up to a whole number. For example, if the data bandwidth ratio of the target IP core to a first initiator IP core is approximately 4 to 1, then the target merely attempts to arbitrate to send responses to the first initiator once every four arbitration cycles.

The rate logic can generate the data bandwidth difference based on a predetermined basis in a static system, such as a System on Chip. The rate logic can generate the data bandwidth difference dynamically in a which the potential initiators and targets can change or at least these devices can change their data bandwidth capability over time.

The rate logic may determine the data bandwidth difference via a table look up that communicates the data bandwidth difference between the target IP core and every initiator IP core that might make requests to this target IP core. This table may be compiled into a read-only memory in a static system where the data bandwidth capabilities are fixed. Similarly, the table may be programmed into a random access memory for systems where the data bandwidth capabilities may be dynamically varied. Software running on a host CPU could re-program the table entries to indicate changes in the clock rates between an initiator IP core and the communication fabric, for example. The rate logic might use the table in the following manner: upon receipt of one or more responses to one or more read requests, the rate logic would use the stored initiator ID from the packet request to interrogate the table and locate the bandwidth difference information associated with the coupled target IP core and the initiator IP core that issued the original request. The rate logic would use the located bandwidth difference to rate control the response packets.

In an embodiment, the bandwidth differences are stored as bandwidth ratios. The rate logic limits the target network adapter response packet bandwidth based on this ratio. This ratio may be calculated as the bandwidth ratio at the initiator network adapter between the communication fabric bandwidth and the initiator interface bandwidth divided by the bandwidth ratio at the target network adapter between the communication fabric bandwidth and the target interface bandwidth:

$$BW_{T/I} = \frac{(\text{data\_word}_{Fabric} \times \text{clock\_freq}_{Fabric})/(\text{data\_word}_{Init} \times \text{clock\_freq}_{Init})}{(\text{data\_word}_{Fabric} \times \text{clock\_freq}_{Fabric})/(\text{data\_word}_{Targ} \times \text{clock\_freq}_{Targ})}$$

$$BW_{T/I} = \frac{\text{data\_word}_{F/I} \times \text{clock\_freq}_{F/I}}{\text{data\_word}_{F/T} \times \text{clock\_freq}_{F/T}}$$

In an embodiment, the communication fabric has wider internal data words than the target IP core interface. In order to use the communication fabric bandwidth efficiently, the target network adapter may pack several read data words associated with the same transaction from the target IP core into a single communication fabric data word. Overall communication efficiency and read latency can be improved by allowing all of the target IP core data words needed to fill a communication fabric data word on consecutive clock cycles. The above combining multiple read data words associated with the same transaction from the target IP core into a single data word communicate across a communication fabric to the initiator IP core is an additional function of the rate control logic. The rate logic can support the behavior described before, which tends to limit the target IP core response data to one word every N cycles, where N is the bandwidth difference expressed as a ratio. The rate logic can also support the ability to allow an entire communication fabric word to be returned by the target IP core together, and then to limit further responses for a longer period of time to compensate for the larger number of target IP core data words that were returned together. This compensation may be described by the following formula:

$$Delay_{resp} = \frac{data\_word_{F/I} \times clock\_freq_{F/I}}{clock\_freq_{F/T}} - data\_word_{F/T}$$

The first term in the formula represents the number of target interface clock cycles required for the initiator to process one communication fabric data word, and the second term represents the number of target interface clock cycles required to fill one communication fabric data word. The resulting term tells the rate logic how many target interface clock cycles to wait after allowing an entire communication fabric data word to be assembled before allowing other target IP core read responses to proceed.

Figure 2A:
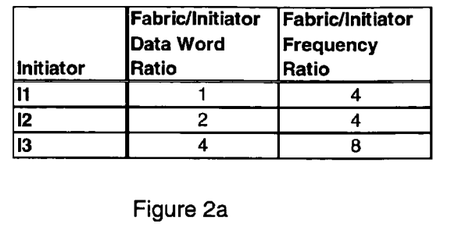
FIGS. 2a-2e illustrate example data bandwidth difference tables.
Figure 2B:
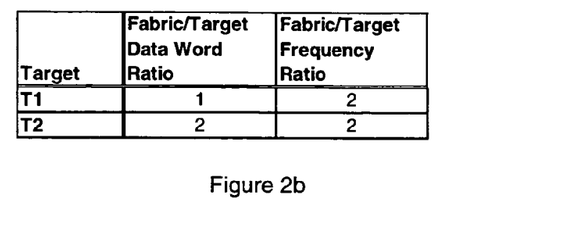
Figure 2C:
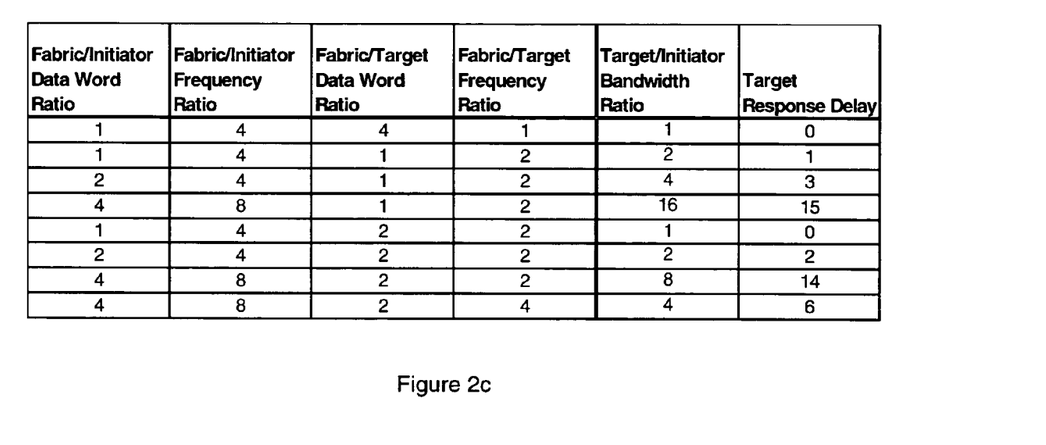

FIG. 2a illustrates example data bandwidth terms for the above equations for three initiator IP cores. Initiator I1 has a fabric-to-initiator interface data word ratio of 1 and a fabric-to-initiator interface clock frequency ratio of 4. FIG. 2b illustrates example data bandwidth terms for the above equations for two initiator IP cores. Target T1 has a fabric-to-target interface data word ratio of 1 and a fabric-to-target interface clock frequency ratio of 2. FIG. 2c illustrates the operation of the above equations for a range of example data bandwidth terms. The fifth column describes the bandwidth ratio between the target and initiator interfaces, as calculated by the first formulas, above. The sixth column describes the response delay to be inserted by the rate logic when the target network adapter is packing target IP core response data words into a larger communication fabric data word, as described by the latter formula, above.

Figure 2D:
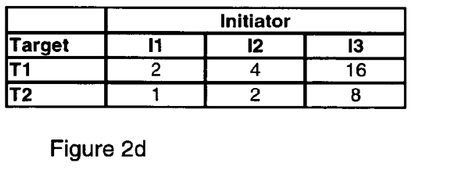
Figure 2E:
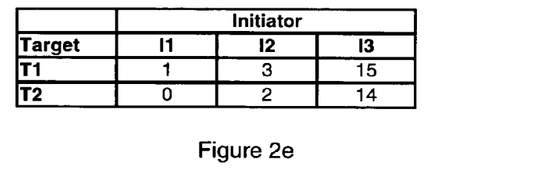

FIG. 2d describes an example table that could be used by rate logic associated with a system that provided rate control based only on bandwidth ratios. Each row in the table represents the ratio to store into the rate logic lookup table for the associated target IP core and each initiator IP core. FIG. 2e describes an example table that could be use by rate logic that is optimizing the rate control based on both the bandwidth ratio and a network adapter that packs narrower target IP data words into a larger communication fabric data word. Each row in the table represents the ratio to store into the rate logic lookup table for the associated target IP core and each initiator IP core.

The rate logic may determine the data bandwidth difference via a dynamic basis by the initiator communicating in a field of a read or write request its data bandwidth capability. The rate logic may dynamically calculate the data bandwidth difference between the initiator and target based on a comparison to its own knowledge of the data bandwidth capability of the target and the communicated knowledge of the data bandwidth capability of the initiator. The initiator data bandwidth capability could be communicated by the initiator network adapter by sending bandwidth terms similar to those stored in FIG. 2a. The target data bandwidth capability could be known by the target network adapter by storing bandwidth terms similar to FIG. 2b. The rate logic then limits the rate at which the target IP core sends transmissions to the initiator without having a priori information about the data bandwidth capability of the initiator. The rate logic could use either a simple bandwidth ratio mechanism, as in the first equations above, or a more complex calculation as described in the latter equation above to determine how to limit the response rate of the target.

The target may determine the data bandwidth difference via a subsequent transmission containing data bandwidth capability information from the initiator. If the initiator is being anticipating being overwhelmed by responses from the target or its buffer has completely filled, then the initiator could send a subsequent transmission to the rate logic to adjust its sustained transmission rate over time to that initiator.

The target may determine the data bandwidth difference on a per initiator basis.

Figure 3:
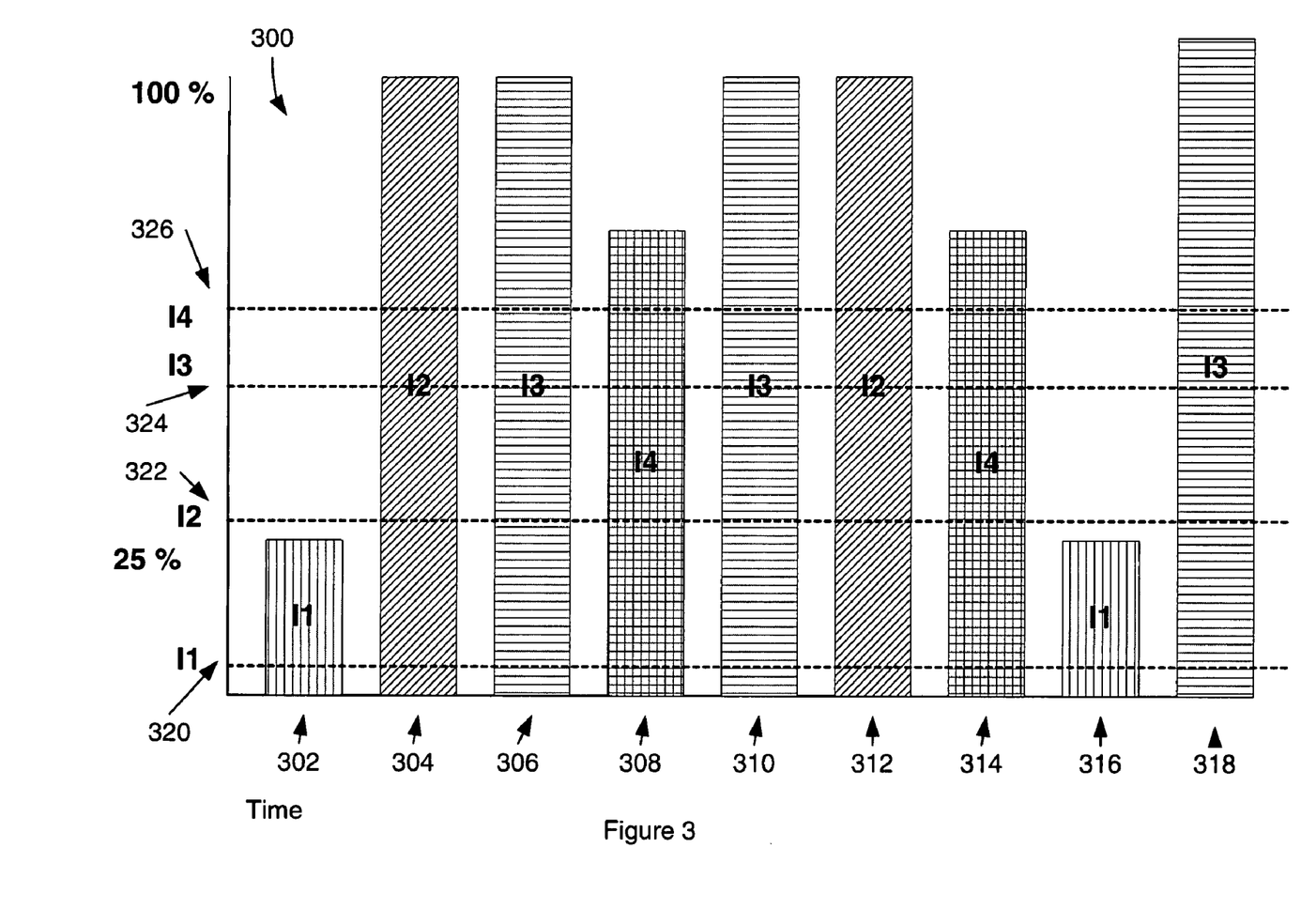
FIG. 3 illustrates an example graph of an embodiment of a time domain multiplexed stream of transmission from the sending device multiplexed on a per data bandwidth capability of each receiving device basis.

FIG. 3 illustrates an example graph of an embodiment of a time domain multiplexed stream of transmission from the sending device multiplexed on a per data bandwidth capability of each receiving device basis. The transmission stream 300 coming from the sending device is shown over time. The transmissions 302-318, such as responses, are shown going to receiving devices, such as first through fourth initiator.

The amount of information communicated per transmission is shown. For example, the initial transmission to the first initiator 302 is transmitted at 25% of the maximum transmission bandwidth of the target device. The initial transmission to the second initiator 304 is transmitted at 100% of the maximum transmission bandwidth of the target device. The maximum transmission bandwidth of the target device may be for example, 256 megabytes.

The transmission rate at which responses are sent to each initiator is also shown. For example, the initial transmission to the first initiator 302 is transmitted on the first arbitration cycle of the target device. The next transmission to the first initiator 316 is transmitted on the seventh arbitration cycle of the target device. The rate logic has transmissions going to the first initiator once every six clock cycles and at $\frac{1}{4}^{th}$ of the maximum transmission bandwidth of the target because the determined data bandwidth difference between the two devices is 24 to 1.

The sustainable data bandwidth capability of the first initiator over time 320 is shown with the first dotted line. The transmission rate established by the rate logic does not exceed the sustainable data bandwidth capability of the first initiator over time 320. The instantaneous transmission pulses to the first initiator 302, 316 when averaged over time do not exceed the sustainable data bandwidth capability of the first initiator over time 320. The graph illustrates similar relationships for transmissions to second and third initiators. The graph illustrates the rate logic also fills in the time domain multiplexed transmission stream with other transmissions, such as transmission to the fourth initiator 308, 314. The transmission rate to fourth initiator is below its maximum sustainable data bandwidth capability of the fourth initiator over time 326. However, algorithms in the rate logic may be used to fill in and determine the composition of time domain multiplexed transmission stream 300.

Thus, the sustained transmission bandwidth from the sending device to the receiving device may be measured by dividing a quantity of data transmitted by the sender device after an arbitration grant by an elapsed time between arbitration grants in order to not exceed a sustainable data bandwidth capability over time of the receiving device.

The rate logic may time domain multiplex the stream of transmission from the sending device. The rate logic may also adjust the instantaneous amount of information transmitted across the shared communication fabric. As discussed above, the data bandwidth capability of a device may be determined by multiplying the clock speed of the device times the number of signal wires connecting to that device. The rate logic may also take into account the indicated size of the buffer associated with that receiving device. If the buffer is big enough to handle two responses from a burst of responses, then the two responses may be communicated across the shared communication fabric in one transmission. For example, the rate logic may be communicating bursts of responses in each response transmission to the third initiator 306, 310, 318 based on the size of its buffers. Nonetheless, the sustained transmission bandwidth from the target to each initiator may be averaged over time between a first transmission and a next transmission to be greater than the inverse of the data bandwidth difference in order to not exceed the sustained data bandwidth capability of the receiving device.

In an embodiment, the rate logic uses an internal arbitration within the target logic to interleave the data responses from the multiple initiators. The rate logic may then also participate in a second arbitration for use of the communication fabric to send the winning transmissions of the internal arbitration over the communication fabric.

Thus, the rate logic in the target transmits multiple signals over a single communication fabric to multiple initiators. Each transmission signal from a lower-speed in data bandwidth capability initiator is time sliced into one higher-speed in data bandwidth capability transmission.

In an embodiment, the transmission rate from the target agent is controlled by means of the time domain multiplexing arbitration within the target agent to provide a lot more precision than the communication fabric arbiter is capable of doing. An interleaver cooperating with the rate logic and an internal arbitration state machine at the target chooses which initiator is going to be sent a response. The responses themselves may be chosen from a set of shared buffers in the target. The interleaver cooperating with the rate logic generates the time domain multiplexed transmission signal from the target.

A thread may be a series of ordered transactions. Different threads may be provided by different initiators or by a single initiator with multiple thread capability, or a combination of both. Transactions associated with different threads can be serviced in an arbitrary order with respect to each other but transactions in a same thread must be serviced in order with respect to each other. Interfaces and communication fabrics that support multiple threads can offer higher total sustainable data bandwidths and lower latencies than fully ordered equivalents, because the ability to reorder prevents earlier slow transactions on one thread from blocking the progress of later fast transactions on different threads. It is therefore desirable in multi-threaded systems to implement flow control schemes that allow independent flow control for each thread, enabling sharing points such as communication fabrics and interfaces to be non-blocking. However, threading tends to increase buffering requirements. For example, a pipelined communication fabric that supports several threads with non-blocking flow control may require storage for each thread at each pipeline stage.

In a system without the rate-based flow control described herein, buffering requirements can be high for a multi-threaded implementation. In many systems it is critical to maximize the throughput of transactions to external memory, particularly DRAM. In the reference system of FIG. 1*b*, the Memory Scheduler 118 might implement eight threads to enable the scheduler to re-order transactions to optimize throughput to DRAM by scheduling accesses to DRAM banks that are idle rather than having to wait for transactions targeting busy banks to complete. If the response path through the target network adapter were multi-threaded, the buffering requirements in the target network adapter might require one communication fabric data word of storage per thread times the depth of the communication fabric pipeline. For a pipeline depth of N, T threads, and a communication fabric data word width D, this would result in N*T*D bits of storage in this target network adapter.

There could also be significant storage in the initiator network adapters without the rate-based flow control. In some systems it is common for there to be many initiator data flow that interact with external DRAM. It is not uncommon to see systems where the sum of the initiating threads is 32 or more. While communication fabric mechanisms exist to combine threads on the path to target network agents, thereby exchanging opportunities for reordering for lower storage, the response path from the Memory Scheduler 118 poses a significant challenge. Any flow control asserted against the responses returning from the scheduler can result in loss of efficiency of the external DRAM. As mentioned above, this is frequently not acceptable. The normal solution is to build a buffer at each initiator that can guarantee that read data returning from the scheduler never blocks. This can require a buffer deep enough to hold as many data words as the initiator can have requested, which can often be several read transactions. This storage is then multiplied by the number of initiator threads in the system, since without rate-based flow control the memory scheduler may send as many read data words back to an arbitrary thread as that thread has requested. A formula to describe the total buffering required would be:

$$Bits_I = \sum_{t=1}^{T_I} D \times O_t$$

where D is the communication fabric data word width in bits, $O_t$ is the maximum number of outstanding read data words associated with initiator thread t (measured in communication fabric data words), and $T_I$ is the total number of initiator threads in the system.

In a static system, the rate logic may be in a thread state machine. In a dynamic system, the rate logic may be in a thread state machine cooperating with the protocol via the data bandwidth information communicated in the transmissions. Either way, the protocol and rate logic implement a rate based flow control.

In an embodiment of the rate logic, the target may have one thread state machine per response path and N number of buffers per thread state machine, where N equals the communication fabric pipeline depth. With this amount of storage, even a multi-threaded target network adapter can accept response data words at the full target IP core rate. The storage is reduced because the rate logic eliminates any flow control uncertainty associated with the receiving initiator network adapters, so there is no benefit to adding extra buffering (e.g. per thread) to attempt to avoid blocking. In an embodiment, each initiator may have one thread state machine per response path and max(N/R, 1) data buffers per response path, where R equals the data bandwidth ratio of the communication fabric to the initiator. The buffering is reduced at the initiator by the rate logic in two ways. Multi-threaded initiators have only one initiator interface to the initiator network adapter. Since the rate logic guarantees that the returned read data will not arrive at higher bandwidth than the data bandwidth capability of the initiator, all read responses can be returned in communication fabric order, so no re-ordering buffering is needed. Furthermore, the depth of the single buffer is reduced by the data bandwidth ratio because the rate logic guarantees that the read data will not arrive any more frequently than one communication fabric data word every R cycles. The size of each data buffer entry D may equal the width of a communication fabric data word. Additional buffer storage may be needed to store other information about the responses.

In summary, the rate control mechanism limits response buffering requirements for multi-threaded, DRAM-dominated systems from:

$$Bits_{total} = D \times \left( N \times T_T + \sum_{t=1}^{T_I} O_t \right)$$

to:

$$Bits_{total} = D \times \left( N + \sum_{i=1}^{I} \frac{N}{R_{F/I}} \right)$$

In an embodiment, due to the intelligence added to the memory subsystem by rate logic, SOC designers can use compiled RAM to consolidate most of the large flip-flop based buffers normally distributed among the various initiator cores into a single shared buffer array within the target memory IP core. This reduces total SOC die area and lowers overall power consumption. The rate logic reduces a need to create big buffers in each potential initiator/sending device because a slightly bigger buffer with data bandwidth logic exists in target. Generally initiators will be sending a lot of read request to a common target, such as the system memory. Thus, the size of a buffer associated with an initiator may be approximately equal to the data bandwidth transmission capability of the target device plus little extra storage to store miscellaneous information. The size of the buffer associated with the initiator may be approximately equal to the data bandwidth transmission capability of the target device rather then equal to multiple times the size of that data bandwidth transmission capability of the target such as two through four times the data bandwidth transmission capability of the target device.

Nonetheless, in an embodiment, the dynamic rate logic is flexible enough to adjust the amount of information transmitted in one transmission cycle based on 1) the communicated size of the buffer at the particular initiator and 2) the initiators data bandwidth capability.

Referring to FIG. 1*b*, the target network adapter 120 receives the responses from the first target.

The target network adapter 122 gains access to the communication fabric by winning a round of arbitration. The target network adapter 122 transmits the N number of write-type data response packets with annotations over the shared interconnect 144.

The target network adapter 120 may also contain translation intelligence. The translation intelligence 148 in the target network adapter 120 receives the responses from the first target.

The translation intelligence 148 in the target network adapter 122 may convert each data response into a special write-type response packet with the address of the initiator in the address field of the write-type response packet. The target network adapter 122 generates the address in the address field of the write-type response packet by using the stored address of the original initiator's address, such as a con ID, in the translation intelligence 148. The translation intelligence 148 in the target network adapter 122 notes the number of response packets in this series sent back to the initiator network adapter 120. The target network adapter 122 annotates the last response packet in this series as the last/final packet in a control field such as the ReqInfo field.

The target network adapter 122 gains access to the communication fabric by winning a round of arbitration. The target network adapter 122 transmits the N number of write-type data response packets with annotations over the shared interconnect 144.

The translation intelligence 124 in the initiator network adapter 120 receives the write-type data response packets and detects for the presence of the annotations. If detected, the translation intelligence 124 in the initiator network adapter 120 converts each write-type data response packet into a standard data response to the read request.

Upon transmitting the last write-type data response packet in this series, the translation intelligence 148 in the target network adapter 122 clears its stored information regarding this request and response transaction. The target network adapter 122 relinquishes control of the communication fabric to allow other network adapters 120, and 126-142 to issue their transactions after a last of the response packets is transmitted.

The translation intelligence 124 in the initiator network adapter 120 checks for the last/final packet annotation in the response packets. Upon converting the last write-type data responses in this series, the translation intelligence 124 in the initiator network adapter 120 clears its stored information regarding this transaction.

The initiator network adapter 120 communicates the N number of data responses to the initial read requests across the first signal interface 146 to the initiating IP core 102.

Accordingly, the shared interconnect 144 with intelligent network adapters 102-142 may use a set of extensions with the write-type request and response packets to facilitate accelerated burst performance for multimedia and computing initiator cores.

In an embodiment, additional measures can be taken to adjust for a mismatch between the data bandwidth capability of the initiator and target OCP. This involves adjusting the Burst Length, as well as deriving Byte Enables for the first and the last Response Packets for cases where the amount of signal wires in the initiator is narrower than the amount of signal wires in the target. When the amount of signal in the initiator wires is wider than the amount of signal wires in the target the Burst Length is adjusted by simply multiplying it by the data bandwidth difference. The rate logic cooperating with the interleaver mechanism in the Packet Response path ensures proper packing of the Response Data for such cases. When the amount of signal wires in the initiator is narrower than the amount of signal wires in the target, both the adjustment algorithm and Byte Enable generation are functions of the starting Address and the Burst Length in addition to the mismatch difference. For example, the Least Significant Bits of the initiator's Word Address and Least Significant Bits of the Burst Length determine whether partial first and last words are required to be accessed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

For example, the information representing the apparatuses and/or methods may be contained in an Instance, soft instructions in an IP generator, or similar machine-readable medium storing this information. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other forms of propagated signals (e.g., carrier waves, infrared signals, digital signals, Electrically Programmable ROMs, Electrically Erasable PROMs, FLASH memory, magnetic or optical cards, or any type of media suitable for storing electronic instructions. The information representing the apparatuses and/or methods stored on the machine-readable medium may be used in the process of creating the apparatuses and/or methods described herein.

The IP generator may be used for making highly configurable, scalable System On a Chip inter-block communication system that integrally manages data, control, debug and test flows, as well as other applications. In an embodiment, an example intellectual property generator may comprise the following: a graphic user interface; a common set of processing elements; and a library of files containing design elements such as circuits, control logic, and cell arrays that define the intellectual property generator.

The instructions and operations also may be practiced in distributed computing environments where the machine-readable media is stored on and/or executed by more than one computer system. In addition, the information transferred between computer systems may either be pulled or pushed across the communication media connecting the computer systems.

While some specific embodiments of the invention have been shown the invention is not to be limited to these embodiments. For example, the rate logic may be configured to frequency domain multiplex the transmission stream from the sending device rather then time domain multiplex the transmission stream. The invention is to be understood as not limited by the specific embodiments described herein, but only by scope of the appended claims.

What is claimed is:

1. An apparatus, comprising:
   a communication fabric to facilitate communications between a plurality of sending devices and at least one receiving device;
   rate logic coupled to the communication fabric, wherein the rate logic is configured to determine a data bandwidth difference between a first data bandwidth capability of the receiving device and a lower of 1) a second data bandwidth capability of a first sending device or 2) a third data bandwidth capability of the communication fabric;
   a comparator cooperating with the rate logic is configured to determine the bandwidth capability of the receiving device, to determine the bandwidth capability of the first sending device, and to determine the bandwidth capability of the communication fabric, wherein the communication fabric communicatively couples to the plurality of sending devices and the receiving device; and
   a buffer in the receiving device to receive transmissions communicated over the communication fabric, wherein the rate logic limits a transmission rate at which the first sending device sends transmissions to the receiving device to ensure the buffer does not sustain loss of data stored in the buffer and the transmission rate at which the first sending device sends transmissions is matched to the bandwidth capability of the receiving device based on the determined data bandwidth difference.

2. The apparatus of claim 1, wherein a sustained transmission bandwidth from the first sending device to the receiving device is measured by dividing a quantity of data transmitted by the first sending device after an arbitration grant by an elapsed time between arbitration grants in order to not exceed a sustainable data bandwidth capability over time of the receiving device.

3. The apparatus of claim 1, wherein the second data bandwidth capability is N times greater than the first data bandwidth capability and N is greater than one.

4. The apparatus of claim 1, wherein the communication fabric is located in a System on a Chip.

5. The apparatus of claim 1, wherein the comparator cooperating with the rate logic determines the data bandwidth difference via a table lookup that communicates the data bandwidth difference between the first sending device and each receiving device.

6. The apparatus of claim 1, wherein the comparator cooperating with the rate logic determines the data bandwidth difference via a dynamic basis by the receiving device communicating in a request its data bandwidth capability.

7. The apparatus of claim 1, wherein the rate logic uses an internal arbitration within the receiving device to interleave transmissions to multiple initiators and then participates in a second arbitration for use of the communication fabric to send the transmissions over the communication fabric.

8. A computer readable medium containing instructions to cause a machine to generate the apparatus of claim 1, wherein the computer readable medium is a non-transitory media.

9. The apparatus of claim 1, wherein the rate logic optimizes a transmission rate at which the first sending device sends transmissions to the receiving device to based on an amount of buffering capability at the receiving device in order to not exceed a sustainable data bandwidth capability over time of the receiving device.

10. A System On a Chip, comprising:
    an interconnect to facilitate communications between a target Intellectual Property (IP) core and two or more initiator IP cores;
    rate logic coupled to the interconnect, wherein the rate logic is configured to implement a rate based flow control; and
    a buffer in the target Intellectual Property (IP) core to receive transmissions communicated over the communication fabric, wherein the rate logic limits a transmission rate at which each initiator IP core sends transmissions to the target IP core to ensure the buffer does not sustain loss of data stored in the buffer and the transmission rate at which each initiator IP core sends transmissions is matched to the bandwidth capability of the target IP core based on a determined data bandwidth difference between the target IP core and that initiator IP core.

11. The apparatus of claim 10, wherein the rate logic cooperates with an interleaver to generate a time domain multiplexed stream of transmissions from the target IP core multiplexed on a per data bandwidth capability of each initiator IP core basis.

12. The apparatus of claim 10, wherein the rate logic determines a transmission rate to each initiator based on data bandwidth capability of that initiator on a per initiator IP core basis.

13. The apparatus of claim 10, wherein the rate logic is also configured to adjust a size of each data transmission transmitted across the interconnect based on the data bandwidth capability of the initiator.

14. The apparatus of claim 10, wherein the rate logic is also configured to adjust a size of each data transmission transmitted across the interconnect based on amount of local buffering present at the initiator.

15. The apparatus of claim 10, wherein the rate logic can limit a rate at which the target IP core sends transmissions to a first initiator IP core without having a priori information about a data bandwidth capability of the first initiator IP core.

16. The apparatus of claim 10, wherein the rate logic is configured to determine a data bandwidth difference between a data bandwidth capability of the target IP core and a data bandwidth capability of an initiator IP core.

17. The apparatus of claim 16, wherein a sustained transmission rate from the target IP core to an initiator IP core is limited so that a sustained data bandwidth to the initiator IP core does not exceed a data bandwidth capability of the initiator IP core based on the determined data bandwidth difference.

18. A computer readable medium containing instructions to cause a machine to generate the apparatus of claim 10, wherein the computer readable medium is a non-transitory media.

19. The apparatus of claim 10, wherein a network adapter has logic to convert, when a block transaction annotation is detected, the block transaction to a single request with annotations in a field of the request to indicate how many read requests were combined and the address sequence associated with the read requests.

20. The apparatus of claim 19, wherein the single request with annotations also indicates the length of the raster line occupied by a target data, the number of rows occupied by the target data, and the length difference between the starting addresses of two consecutive rows occupied by the target data.

21. A method of communicating information across a communication fabric coupled to at least a first and a second sending device and at least one receiving device, comprising:
determining a data bandwidth difference between a first data bandwidth capability of a receiving device and a lower of 1) a second data bandwidth capability of the first sending device or 2) a third data bandwidth capability of the communication fabric; and
limiting a transmission rate of the first sending device to the receiving device so that a sustained data bandwidth to the receiving device does not exceed the data bandwidth capability of the receiving device based on the determined data bandwidth difference.

22. The method of claim 21, further comprising:
limiting the sustained data bandwidth to the receiving device also based on an amount of local buffering at the receiving device.

23. A method of communicating information across a communication fabric coupled to at least a sending device and two or more receiving devices, comprising:
determining a data bandwidth difference between a first data bandwidth capability of a first receiving device and a lower of 1) a second data bandwidth capability of a sending device or 2) a third data bandwidth capability of the communication fabric;
determining the bandwidth capability of the first receiving device, to determine the bandwidth capability of the sending device, and to determine the bandwidth capability of communication fabric; and
limiting the transmission rate of the sending device to ensure that local buffering of the first receiving device may be minimized without loss of data and with a sustained bandwidth that matches the first data bandwidth capability of the first receiving device based on the determined data bandwidth difference.

24. A method of communicating information across a communication fabric coupled to at least a sending device and two or more receiving devices, comprising:
determining a data bandwidth difference between a first data bandwidth capability of a first receiving device and a lower of 1) a second data bandwidth capability of a sending device or 2) a third data bandwidth capability of the communication fabric; and
combining multiple read data words associated with the same transaction from a sending device into a single data word to be communicated across a communication fabric to the first receiving device.

25. An apparatus to communicate information across a communication fabric coupled to at least a first and a second sending device and at least one receiving device, comprising:
means for determining a data bandwidth difference between a first data bandwidth capability of a receiving device and a lower of 1) a second data bandwidth capability of a first sending device or 2) a third data bandwidth capability of the communication fabric;
means for determining the bandwidth capability of the receiving device, to determine the bandwidth capability of the first sending device, and to determine the bandwidth capability of communication fabric; and
means for limiting a transmission rate at which the first sending device sends transmissions to the receiving device to prevent overloading the first data bandwidth capability of the receiving device based on the determined data bandwidth difference.

* * * * *